March 29, 1960     C. L. SHARP     2,930,626
INDEXING CHUCK

Filed Aug. 7, 1958     3 Sheets-Sheet 1

INVENTOR.
CHESTER L. SHARP
BY *Jerry J Dunlap*
ATTORNEY

March 29, 1960

C. L. SHARP 2,930,626

INDEXING CHUCK

Filed Aug. 7, 1958

INVENTOR.
CHESTER L. SHARP

BY

*Jerry J Dunlap*

ATTORNEY

March 29, 1960

C. L. SHARP 2,930,626

INDEXING CHUCK

Filed Aug. 7, 1958

INVENTOR.
CHESTER L. SHARP
BY
ATTORNEY

United States Patent Office 2,930,626
Patented Mar. 29, 1960

2,930,626

INDEXING CHUCK

Chester L. Sharp, Tulsa, Okla.

Application August 7, 1958, Serial No. 753,709

11 Claims. (Cl. 279—5)

This invention relates generally to improvements in lathes, and more particularly, but not by way of limitation, to an improved indexing type chuck for lathes.

As it is well known in the art, in the manufacture of many different types of devices and tools, a work piece requires similar machine work from two or more different directions. For example, in the manufacture of many types of valves, the valve body has three openings therein spaced 90 degrees apart, with each of the openings requiring boring and machining operations. Such work pieces are ordinarily machined in a single lathe by use of what is commonly known in the art as an indexing chuck. These chucks comprise a face plate or body rigidly secured to the lathe spindle, with a work piece holder rotatably carried by the chuck body in such a manner that the work piece holder may be indexed or turned about an axis at right angles to the axis of the lathe spindle. Therefore, when one portion of the work piece has been machined, the work piece holder may be indexed with respect to the chuck body to present a subsequent portion of the work piece to the action of the lathe tools.

It will be apparent that the work piece holder must be supported with sufficient clearance therearound to permit the work piece holder to be turned between the various machining operations. Heretofore, such work piece holders have been supported only by arms extending forwardly from the main portion of the chuck body, with opposite portions of the work piece holder journaled in the arms. As a result, these prior indexing chucks have been subject to substantial vibration during a machining operation, such that the chucks are seldom used for precise machine work. Furthermore, when such indexing chucks are permitted to vibrate to any appreciable degree, the chucks, and sometimes the lathes, are damaged, requiring expensive repairs and lost production time. Also, prior indexing chucks have utilized a complicated indexing mechanism to move the work piece into the desired machining positions.

The present invention contemplates a novel indexing chuck comprising a work piece holder journaled in a pair of arms extending forwardly from the main chuck body, with a novel locking device for rigidly coupling the work piece holder to the main chuck body when work is being performed on a work piece held by the work piece holder. The present locking device acts in the nature of a wedge disposed between the work piece holder and the main chuck body in a position to resist any thrust or vibration imposed on the work piece holder. In the preferred embodiment, the locking device comprises a circular plate having cams secured thereon in circumferentially spaced relation in positions to be wedged against spaced portions of the work piece holder in one position of the plate and form a wedge between the work piece holder and the main body portion of the chuck, with the cams also being so located as to be retracted from the work piece holder in a second position of the supporting plate, such that the work piece holder may be freely indexed to the next working position without interference by the locking device.

An important object of this invention is to increase the economy of the operation of lathes using indexing type chucks.

Another object of this invention is to provide an indexing type chuck wherein the work piece holder of the chuck may be freely indexed from one work position to another, yet the work piece holder will be rigidly supported when a work piece held in the holder is being machined.

Another object of this invention is to provide a rigid coupling between the work piece holder and the main body portion of an indexing chuck.

A further object of this invention is to provide a novel cammed locking device wedged between the main body portion of an indexing chuck and spaced portions of the work piece holder of the chuck.

A still further object of this invention is to provide a simply constructed indexing chuck which will have a long service life and which may be economically manufactured.

Other objects and advantages of the invention will be evident from the following detailed description, when read in conjunction with the accompanying drawings which illustrate my invention.

Figure 2:
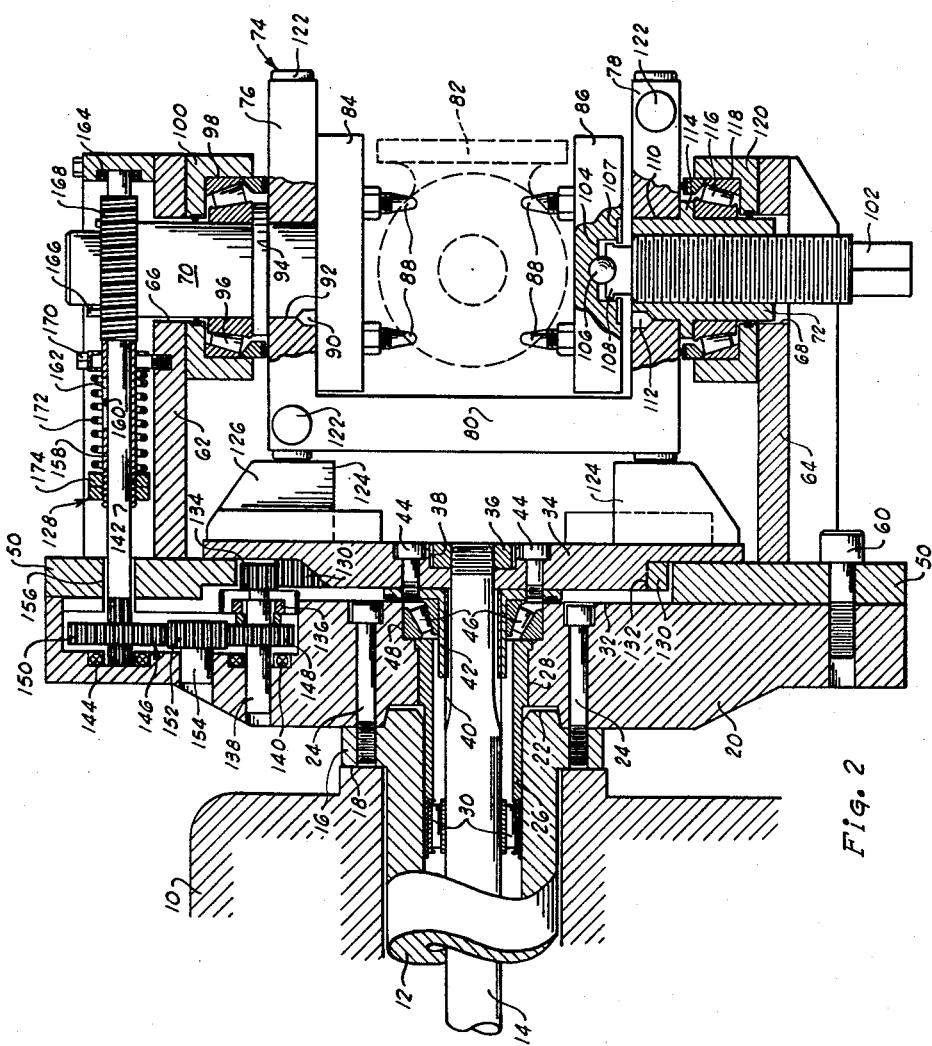
Figure 2 is a vertical sectional view through the indexing chuck shown in Fig. 1, with portions of the chuck shown in elevation to more clearly illustrate details of construction.

Referring to the drawings in detail, and particularly Fig. 2, reference character 10 designates the head stock of a lathe having a spindle or mandrel 12 journaled therein and extending forwardly from the head stock 10 in the usual fashion. In practicing this invention, the spindle 12 is preferably tubular to rotatably receive an indexing drive shaft 14 extending from a suitable indexing motor (not shown). It will also be understood that the spindle 12 is driven by a motor (not shown) mounted upon the lathe having the head stock 10. The outer portion 16 of the spindle 12 is flanged outwardly and engages a complimentary portion 18 of the head stock 10 to transmit thrust from the spindle 12 to the head stock 10 and prevent rearward movement of the spindle 12 in the head stock 10.

A face plate or chuck body 20 is secured to the outer end portion 22 of the lathe spindle 12 by suitable connecting bolts 24 to rigidly secure the face plate 20 on the spindle 12. The face plate 20 contacts the enlarged portion 16 of the spindle 12, such that substantial thrust may be imposed on the face plate 20 without damage either to the face plate or the spindle 12. A sleeve 26 is wedged in a bore 28 extending through the center of the face plate 20, and into the spindle 12 to support the shaft 14. A roller bearing unit 30 has its inner race secured on the indexing motor drive shaft 14 and its outer race secured in the sleeve 26 to rotatably support the drive shaft 14 and permit substantially free rotation of the shaft 14 in the spindle 12 and face plate 20.

The indexing motor drive shaft 14 extends through both the spindle 12 and the face plate 20 and protrudes beyond the forward face 32 of the face plate 20 into connection with a bracing or support plate 34. The forward end of the shaft 14 may be secured to the bracing plate 34 in any suitable manner, such as by a nut 36 threaded on the end of the shaft 14 and fitted within a counterbore 38 in the central portion of the bracing plate 34. It will thus be apparent that the nut 36 and counterbore 38 prevent a forward movement of the bracing plate 34 away from the forward face 32 of the face plate 20. Also, splines 40 are provided in the outer periphery of the forward end portion of the shaft 14 to receive a splined hub 42. The hub 42 is in turn secured to the bracing plate 34 by suitable bolts 44.

Figure 1:
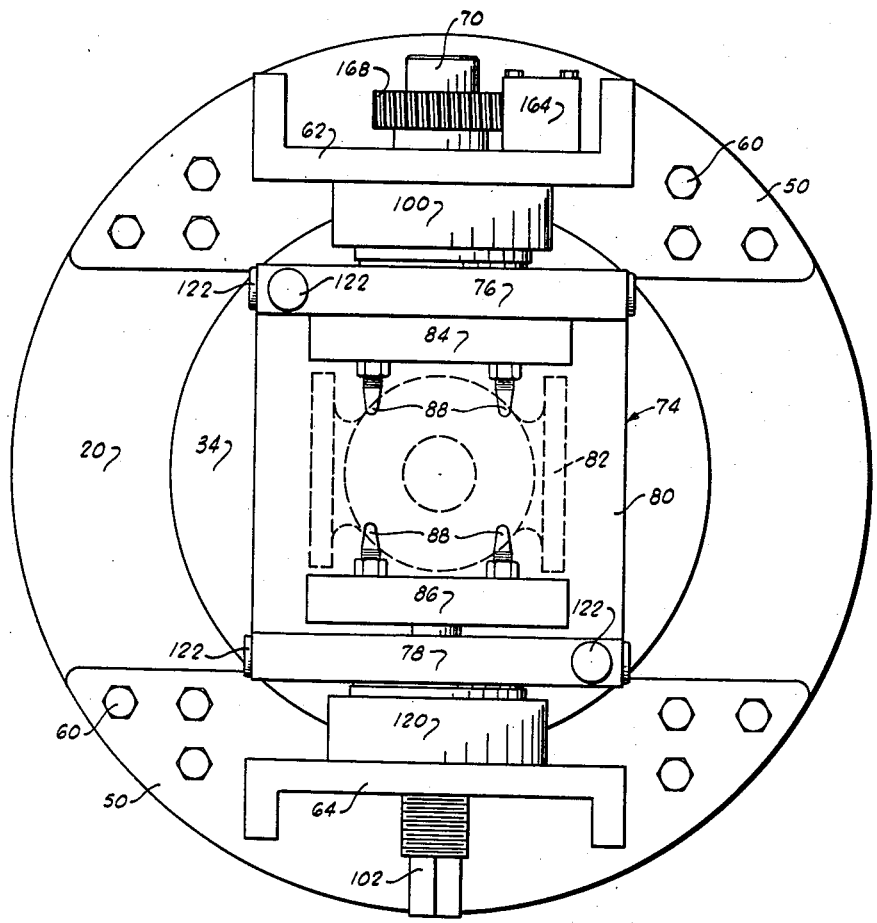
Figure 1 is a front elevational view of an indexing chuck constructed in accordance with this invention.

The inner race of a combination thrust and retaining type bearing 46 is tightly fitted around the hub 42, and the outer race of the bearing unit 46 is wedged into a counter-bore 48 in the face plate 20, such that the bearing unit 46 additionally prevents endwise movement of the bracing plate 34 away from the forward face 32 of the face plate 20. It will therefore be apparent that the bracing plate 34 may be turned with respect to the face plate 20, yet the bracing plate 34 will be fixed longitudinally with respect to the face plate 20. Also, semicircular shaped bearing plates 50 (see also Fig. 1) are secured by bolts 60 to diametrically opposed portions of the forward face 32 of the face plate 20 and extend inwardly beyond the outer periphery of the bracing plate 34 to provide bearing surfaces for the outer peripheral portion of the bracing plate 34. Thus, any thrust imposed on the bracing plate 34 will be transmitted through the bearing plates 50 and bearing unit 46 to the face plate 20 and hence through the portion 16 of the spindle 12 to the head stock 10 of the lathe.

A pair of arms 62 and 64 are rigidly secured to the face plate 20 through the medium of the bearing plates 50 and extend forwardly from the face plate 20 in parallel relation on diametrically opposite sides of the center line of the face plate 20. The arms 62 and 64 are provided with alined apertures 66 and 68, respectively, to receive the shafts 70 and 72 of the work piece holder which is generally designated by reference character 74.

The holder 74 comprises opposed end plates 76 and 78 inter-connected by a side plate 80 to provide a generally C-shaped holder which exposes a work piece 82 secured therein on three sides. The end plates 76 and 78 are rigidly secured to the opposite ends of the side plate 80, or, all of these plates may be found out of one piece of material to provide a strongly constructed holder 74. The work piece 82 may be gripped in the holder 74 in any suitable manner, such as by support plates 84 and 86 having gripping members 88 threadedly secured therein and extending into contact with spaced portions of the work piece 82. When the work piece 82 is in the form of a T, as shown, the gripping members 88 may be in the form of bolts threaded into the respective plates 84 and 86, such that the bolts may be adjusted to tightly engage spaced points on the T 82 and rigidly secure the T 82 to the plates 84 and 86.

The support plate 84 is secured on the lower end of the shaft 70 and is keyed to the end plate 76 by means of a suitable key 90 to prevent rotation of the plate 84 with respect to the end plate 76. It will be observed that the shaft 70 extends through a bore 92 in the central portion of the end plate 76 and is provided with an outwardly extending circumferential flange 94 in contact with the outer face of the end plate 76 to rigidly secure the support plate 84 to the end plate 76. The inner race of a roller bearing unit 96 is fitted tightly around the shaft 70, and the outer race of the bearing unit 96 is fitted tightly in a counter-bore 98 formed in a flanged member 100 rigidly secured on the inner face of the arm 62. The bearing unit 96 is also a combination thrust and retaining type unit to transmit any end-wise thrust imposed on the shaft 70 to the arm 62 and to retain the shaft 70 assembled in the arm 62. The flanged member 100 is secured to the arm 62 in any suitable manner (not shown).

The support plate 84 is secured on the upper end of an adjusting member 102 threaded through the shaft 72. The member 102 extends into a counter-bore 104 formed in the outer face of the support plate 86. A ball bearing 106 is fitted in mating grooves or indentations in the end of the counter-bore 104 and the respective end of the member 102, such that the support plate 86 may be adjusted or turned with respect to the member 102, yet any thrust imposed on the support plate 86 in the direction of the respective end plate 78 of the holder 74 will be transmitted through the ball 106 to the member 102. A suitable ring 107 is secured around the counter-bore 104 to retain the headed portion 108 of the member 102 in the counter-bore 104.

As previously indicated, the shaft 72 is tubular in form and extends through a bore 110 formed in the central portion of the holder end plate 78, with the shaft 72 being keyed to the plate 78 by a suitable key 112 to prevent rotation between the shaft 72 and the holder 74. Also, a circumferential flange 114 is formed around the outer periphery of the tubular shaft 72 to receive and support the end plate 78 of the holder 74. The inner race of a roller bearing unit 116 is tightly fitted on the tubular shaft 72 immediately outward of the flange 114, and the outer race of the bearing unit 116 is fitted tightly in a counter-bore 118 formed in a flanged member 120 rigidly secured to the inner face of the support arm 64. The bearing unit 116 is another combination thrust and retaining type bearing unit, such that any thrust imposed on the shaft 72 will be transmitted to the member 120 and the arm 64, yet the shaft 72 will be retained in assembly in the arm 64. The flanged member 120 is rigidly secured to the inner face of the arm 64 in any suitable manner.

In operation of the work piece holder 74, it will be observed that the holder is prevented from end-wise movement by the bearing units 96 and 116 and that when the holder 74 is turned, the shaft 70 is turned in the respective supporting arm 62. When replacing the work piece 82, the adjusting bolt 102 is partially unthreaded from the shaft 72 to move the support plate 86 away from the support plate 84 and disengage the gripping members 88 from the work piece. The work piece 82 may then be lifted freely out of the holder 74 and a new work piece 82 positioned between the various gripping members 88; whereupon the adjusting bolt 102 is threaded back through the tubular shaft 72 until all of the gripping members 88 tightly engage the outer surface of the new work piece 82.

Figure 3:
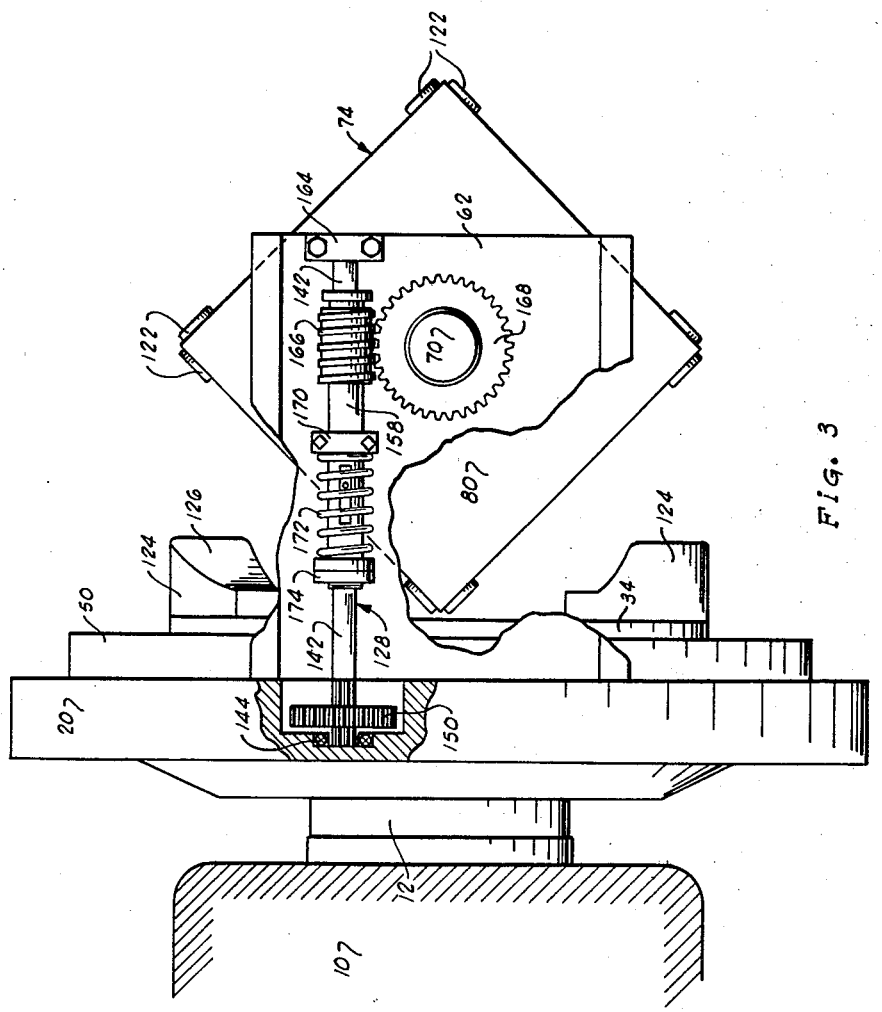
Figure 3 is a plan view of the chuck illustrating indexing of the work piece holder, and with portions of the chuck broken away to more clearly illustrate the operation.

Bearing pads 122 are secured at two of the opposite corners of each side of the work piece holder 74 for engagement by a pair of cams 124 secured on the forward face of the bracing plate 34. As shown in Fig. 3, each of the cams 124 is provided with a tapered surface 126 providing a wedging surface for moving the cams 124 progressively into tighter engagement with a pair of the bearing pads 122 when the holder 74 is turned to a working position where a pair of the bearing pads 122 are arranged in a plane substantially at right angles to the center line axis of the bracing plate 34 and the face plate 20. It will be apparent that when the holder 74 is in a working position, as illustrated in Fig. 2, a turning movement of the bracing plate 34 in one direction will bring the cams 124 into wedging engagement with the respective bearing pads 122 on the side of the holder 74 exposed to the bracing plate 34. On the other hand, when the bracing plate 34 is turned in the opposite direction, the cams 124 will be removed from the respective bearing pads 122, such that the holder 74 may be turned on the axis of the shafts 70 and 72 as illustrated in Fig. 3. It may also be noted that the bracing plate 34 needs to be turned only a sufficient number of degrees to move each cam 124 vertically out of alignment with the respective upper or lower bearing pads 122 in order for the holder 74 to be completely free of the cams 124 for an indexing movement to a subsequent working position. Therefore, the bracing plate 34 needs to be turned less than ninety degrees, such as about fortyfive degrees, in engaging the cams 124 with the bearing pads 122 and disengaging the cams from the bearing pads during an indexing movement of the holder 74.

When the cams 124 are wedged against a pair of the bearing pads 122, as illustrated in Fig. 2, any thrust imposed on the holder 74 in the direction of the head stock 10 will be transmitted through the cams 124, bracing plate 34, bearing plates 50, face plate 20, and spindle 12 to the head stock, such that the holder 74 will be rigidly supported and will not be subjected to any appreciable vibration during machining work on the work piece 82. It will also be apparent that the bearing pads 122 could be eliminated and the cams 124 wedge directly against the respective portions of the holder 74; however, when the bearing pads 122 are used, more precise positioning of the holder 74 is provided and the holder 74 need not be made out of a bearing type metal, to provide a more economical construction.

The operation of the bracing plate 34 and the operation of the holder 74 may be controlled independently, as well as manually. However, I prefer to provide a drive system, as generally designated by reference character 128, for automatically indexing the holder 74 when the cams 124 are released from the holder 74 at the conclusion of a machining operation on one portion of the work piece 82.

The drive system 128 comprises a ring gear 130 rigidly mounted on a complimentary flange 132 on the rear face of the bracing plate 34 in any suitable manner (not shown). The ring gear 130 is therefore protected by the bracing plate 34 and the bearing plates 50 to provide a minimum exposed area of the teeth of the gear 130. A pinion 134 is secured by a clutch 136 to one end of a stub shaft 138 journaled in the face plate 20 by a suitable bearing 140. The clutch 136 is a free wheeling clutch of the type used in automobile starter drives and acts in the nature of a ratchet to provide a turning movement of the shaft 138 only when the pinion 134 is turned in one direction. When the pinion 134 is turned in the opposite direction, the clutch 136 is disengaged and the shaft 138 is not turned. In the preferred embodiment, the clutch 136 is so constructed to provide a turning movement of the shaft 138 when the bracing plate 34 and ring gear 130 are turned in a direction to release the cams 124 from the bearing pads 122 of the holder 74. It will be understood that when the bracing plate 34 and ring gear 130 are turned in one direction, the pinion 134 will be turned in an opposite direction.

Another shaft 142 is journaled in the face plate 20 by a suitable bearing unit 144 and is drivingly connected to the shaft 38 by a gear train generally designated by reference character 146. The gear train 146 preferably comprises a gear 148 rigidly mounted on the shaft 138, a gear 150 mounted on the shaft 142 and an idler gear 152 mounted between the gears 148 and 150. The idler 152 may be supported on the end of a suitable shaft 154 which is also journaled in the face plate 20. The gear 150 is preferably splined to the respective end portion of the shaft 142 to facilitate assembly of the gear train and the shaft 142 in the face plate 20. In any event, rotation of the gear 150 is transmitted to the shaft 142.

The shaft 142 extends forwardly from the face plate 20 through a bore 156 in the respective bearing plate 50 and has a tube or sleeve 158 telescoped over the outer end portion thereof. It will also be noted that a suitable key 160 is formed or secured on the outer periphery of the shaft 142 and extends through a slot 162 in the sleeve 158, such that the sleeve 158 may be moved lengthwise on the shaft 142 but the sleeve 158 will be turned when the shaft 142 is turned. As shown in Fig. 3, the shaft 142 extends all the way through the sleeve 158 and the forward end thereof it journaled by a suitable bearing unit 164 mounted on the outer end portion of the respective support arm 62 to maintain the shaft 142 and sleeve 158 in the proper operating positions. A worm 166 is rigidly secured on the sleeve 158 and meshes with a worm gear 168 rigidly mounted on the shaft 70 of the work piece holder 74. The worm 166 and worm gear 168 operate in the usual manner to provide rotation of the gear 168 about an axis at right angles to the axis of the worm 166 upon rotation of the worm 166.

As shown in both Fig. 2 and Fig. 3, the sleeve 158 extends loosely through an apertured bracket 170 mounted on the respective support arm 62. A helical compression spring 172 surrounds the sleeve 158 and extends from the bracket 170 rearwardly over the sleeve 158 into engagement with suitable nuts 174 threadedly secured on the rearmost end of the sleeve 158. It will therefore be observed that the spring 172 constantly urges the sleeve 158 rearwardly over the shaft 142. The spring 172 is used to store energy in the drive system 128 when the bracing plate 34 is first turned and before release of the holder 74, as described in detail below.

In following the operation of the drive system 128, let it first be assumed that the cams 124 are in engagement with a pair of the bearing pads 122 and locking the work piece holder 74 in an operating position as illustrated in Fig. 2. When the respective machining operation on the work piece 82 is completed, the indexing motor turns the shaft 14 in a direction to release the cams 124 from the respective bearing pads 122. Let it further be assumed that the shaft 14 is turned clock-wise when viewed from the front of the chuck as in Fig. 1. During this initial clock-wise movement of the shaft 14, the bracing plate 34 and ring gear 130 will be simultaneously turned in a clock-wise direction. The pinion 134 will therefore be turned in a counter-clockwise direction. As previously indicated, during this movement of the ring gear 130 and the pinion 134, the clutch 136 will be engaged to also provide a counter-clockwise rotation of the gear 148. Movement of the gear 148 is transmitted through the gear 152 to simultaneously turn the gear 150 and shaft 142 in a counter-clockwise direction.

The turning movement of the shaft 142 is transmitted through key 160 to simultaneously turn the sleeve 158 and worm 166 in a counter-clockwise direction. During this initial turning movement of the shaft 114 and gears 130, 134, 148, 152, and 150, shaft 142, sleeve 158, and worm 166, the cams 124 will be sufficiently engaged with the respective bearing pads 122 to prevent a turning movement of a holder 74 and the worm gear 168. Therefore, during this initial turning movement, the worm 166 will crawl forwardly along the worm gear 168 and move the sleeve 158 forwardly along the shaft 142, while simultaneously compressing the spring 172 between the nuts 174 and bracket 170. As soon as the cams 124 have been sufficiently disengaged from the respective bearing pads 122 to release the holder 74 for a turning movement, any further turning of the worm 166 in a counter-clockwise direction will turn the worm gear 168 and the holder 74 as indicated in Fig. 3. Also, the spring 172 will tend to move the sleeve 158 and worm 166 rearwardly along the shaft 142 which will provide a further turning of the worm gear 168 and a further turning movement of the holder 74.

It will be apparent that the gear ratios of the gear train 146 and the worm 166 and worm gear 168 may be easily adjusted to turn the holder 74 precisely 90 degrees when the bracing plate 34 is moved a specific number of degrees to completely release the cams 124 from the holder 74. However, I prefer to adjust these gear ratios such that the holder 74 is turned slightly less than 90 degrees during this releasing movement of the cams 124. Therefore, when the indexing motor returns the cams 124 to their locking positions, the cams 124 will contact the bearing pads 122 on the side of the holder 74 exposed to the bracing plate 34 and complete the turning movement of the holder 74 during the final counter-clockwise locking movement of the cams 124. In this manner, the holder 74 will not be intervertently moved beyond 90 degrees in any one indexing movement which would foul the indexing operation.

As will be apparent to those skilled in the art, the indexing motor drivingly connected to the shaft 14 may be automatically controlled to turn the shaft 14 a predetermined number of degrees in a clockwise direction and then in a counter-clockwise direction to provide an unlocking of the holder 74, indexing of the holder 74, and the locking of the holder 74 in a new working position without the necessity of attention by the operator. When the shaft 14 is moved in a direction to release the holder 74, movement of the shaft 14 is transmitted through the clutch 36 to turn the worm 166 in the proper direction for indexing the holder 74 to its new position. When the shaft 14 is turned in the opposite direction for locking the holder 74 in the new position, the clutch 136 will be disengaged, such that the drive system 128 will be taken out of operation and the holder 74 will not be turned to any further extent by movement of the drive system 128. The movement of the cams 124 may be performed at a substantial speed, such that the time of indexing the holder 74 may be reduced to a minimum and materially accelerate the rate of production.

From the foregoing it will be apparent that the present invention will increase the economy of operation, as well as the service life of lathes using indexing type chucks. With the present chuck construction, the work piece holder will be rigidly secured or coupled to the main body portion of the chuck to assure that neither the work piece nor the holder 74 will be vibrated during a machining operation. The holder 74 is supported against movement in three different directions to accommodate any thrust which may be imposed thereon by a machining operation. It will also be apparent that the present invention provides a locking device for rigidly coupling the work piece holder of an indexing chuck to the main body portion of the chuck by a wedging action against spaced portions of the work piece holder to provide a rigid coupling between the holder and the chuck body. It will be further apparent that the present indexing chuck is simple in construction, is sturdily built for a long service life and may be economically manufactured.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. A chuck, comprising a face plate having a forward face and a rear face, a pair of arms rigidly secured to the face plate and extending forwardly from the face plate in spaced relation, a work piece holder rotatably carried between said arms in spaced relation from the forward face of the face plate for indexing on an axis at right angles to the centerline axis of the face plate, a movable tapered cam carried by the face plate to form a wedge between the face plate and the work piece holder in one position thereof and, alternately, release the work piece holder for indexing movement in a second position thereof, and means for moving said cam between said positions.

2. A chuck, comprising a face plate having a forward face and a rear face, a pair of arms rigidly secured to the face plate and extending forwardly from the face plate on diametrically opposite sides of the centerline axis of the face plate, a work piece holder rotatably carried between said arms in spaced relation from the forward face of the face plate for indexing about an axis at right angles to the centerline axis of the face plate, a bracing plate rotatably secured to the face plate in contact with the forward face of the face plate, a tapered cam on the bracing plate arranged to be wedged against the work piece holder in one position of the bracing plate and, alternately, released from the work piece holder in a second position of the bracing plate, and means for turning the bracing plate between said positions.

3. A chuck as defined in claim 2 characterized further to include a second tapered cam on the bracing plate in circumferentially spaced relation from the first-mentioned cam to engage spaced portions of the work piece holder in said one position of the bracing plate.

4. A chuck as defined in claim 2 characterized further in that the work piece holder is substantially C-shaped, and characterized further to include a second tapered cam on the bracing plate in diametrically opposed relation from the first-mentioned cam for engaging one side edge of the work piece holder at spaced points in said one position of the bracing plate.

5. A chuck as defined in claim 2 characterized further to include a ring gear on the bracing plate, a gear on the work piece holder, and a drive system extending between said ring gear and the gear on the work piece holder for indexing the work piece holder upon movement of the bracing plate between said positions.

6. A chuck, comprising a face plate having a forward face and a rear face, a pair of arms rigidly secured to the face plate and extending forwardly from the face plate on diametrically opposite sides of the centerline axis of the face plate, a work piece holder journaled between said arms in spaced relation from the forward face of the face plate for indexing movement on an axis at right angles to the centerline axis of the face plate, a bracing plate journaled to the central portion of the face plate for rotation about the centerline axis of the face plate, said bracing plate being in sliding contact with the forward face of the face plate, means for turning the bracing plate, and a plurality of tapered cams carried by the bracing plate in positions to wedge against the work piece holder in a first position of the bracing plate and release the work piece holder for indexing movement in a second position of the bracing plate.

7. A chuck as defined in claim 6 characterized further to include a ring gear on the bracing plate, a gear carried by the work piece holder, and a drive system between said ring gear and the gear carried by the work piece holder for indexing the work piece holder during movement of the bracing plate.

8. A chuck, comprising a face plate having a forward face and a rear face, a pair of arms rigidly secured to the face plate and extending from the forward face of the face plate in spaced relation, a work piece holder, a shaft extending from each end of the work piece holder and journaled in one of said arms in spaced relation from the forward face of the face plate on an axis at right angles to the centerline axis of the face plate, means for indexing the work piece holder between working positions about its supporting axis, a bracing plate journaled to the face plate in sliding contact with the forward face of the face plate, a shaft secured to the bracing plate for turning the bracing plate relative to the face plate, and a plurality of tapered cams secured on the bracing plate on the face thereof opposite the face plate in circumferentially spaced relation in positions to be wedged against the work piece holder in a first position of the bracing plate and to release the work piece holder for indexing movement in a second position of the bracing plate.

9. A chuck as defined in claim 8 characterized further in that said work piece holder comprises a pair of end plates and one side plate to provide a substantially C-shape in cross section, and grips carried by the end plates for supporting a work piece in the holder, said cams being spaced to engage at least two opposite corners of the work piece holder in each of the working positions of the holder.

10. A chuck as defined in claim 8 characterized further in that said means for indexing the work piece holder comprises a worm gear on one of the shafts of the work piece holder, a worm supported in meshing relation with said worm gear, a ring gear on the bracing plate, and means drivingly connecting the ring gear to the worm for turning the work piece holder during movement of the bracing plate.

11. A chuck as defined in claim 10 characterized further in that said means connecting the ring gear to the worm comprises a drive shaft journaled in the face plate and extending from the forward face of the face plate, a sleeve slidingly telescoped over said drive shaft and connected to the worm, said sleeve being splined on said drive shaft for turning the worm upon rotation of said drive shaft, a gear drive connecting said drive shaft to the ring gear, a free-wheeling clutch in said gear drive to provide rotation of said drive shaft only when the bracing plate turns from said first to said second positions, and a spring anchored between said sleeve and the face plate urging said sleeve toward the face plate to store energy during turning of said drive shaft and worm prior to release of the work piece by said cams.

References Cited in the file of this patent

UNITED STATES PATENTS

| | | |
|---|---|---|
| 2,480,715 | De Graff | Aug. 30, 1949 |
| 2,596,484 | Hunziker | May 13, 1952 |
| 2,643,132 | Hunziker | June 23, 1953 |